Figure 1:
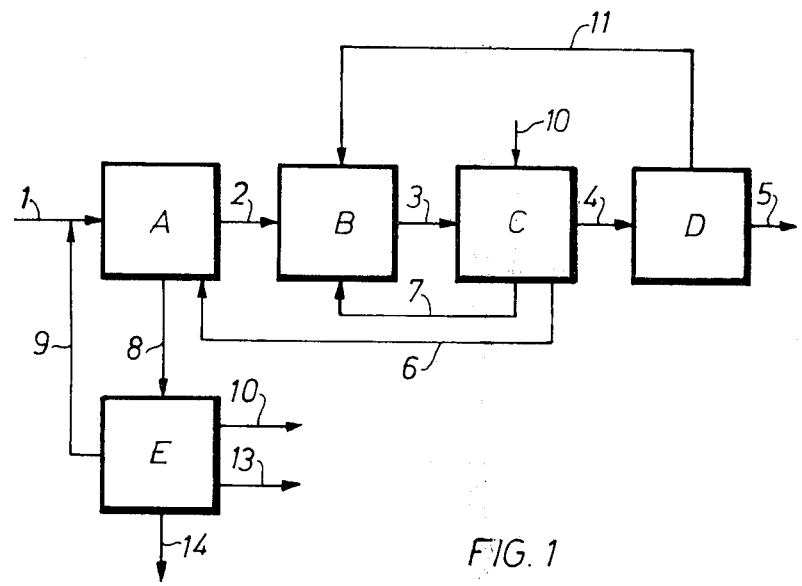

United States Patent [19] [11] 3,899,485
Immel et al. [45] Aug. 12, 1975

[54] PROCESS FOR THE PURIFICATION OF CAPROLACTAM

[75] Inventors: Otto Immel; Hans Helmut Schwarz, both of Krefeld, Germany

[73] Assignee: Bayer Aktiengesellschaft, Germany

[22] Filed: Jan. 23, 1973

[21] Appl. No.: 326,125

[30] Foreign Application Priority Data
Jan. 28, 1972    Germany............................ 2203945

[52] U.S. Cl.......................................... 260/239.3 A
[51] Int. Cl................................................ C07d 1/06
[58] Field of Search............................. 260/239.3 A

[56] References Cited
UNITED STATES PATENTS
2,313,026  3/1973  Schlack......................... 260/239.3 A
2,758,991  8/1956  Kretzers et al................ 260/239.3 A
3,792,045  2/1974  Henn et al. ................... 260/239.3 A
3,794,647  2/1974  Henn et al. ................... 260/239.3 A FOREIGN PATENTS OR APPLICATIONS
2,148,717  4/1972  Germany ..................... 260/239.3 A
2,163,258  6/1972  Germany ..................... 260/239.3 A Primary Examiner—Henry R. Jiles
Assistant Examiner—Robert T. Bond
Attorney, Agent, or Firm—Connolly and Hutz

[57] ABSTRACT

Object of the invention is a process for the purification of ε-caprolactam prepared either by Beckmann rearrangement or by rearrangement of cyclohexanoxime in the gaseous phase or by depolymerisation of polyamide waste comprising treating the solid, finely-divided crude lactam with an organic solvent for a period of up to 60 hours at a temperature from 0° to 50°C. According to the purification process many impurities could be removed without a substantial decrease in the yield of the purified caprolactam.

15 Claims, 1 Drawing Figure

PROCESS FOR THE PURIFICATION OF CAPROLACTAM

This invention relates to a process for the purification of lactams.

Numerous publications deal with the purification of lactams because caprolactam is required in a highly purified state for the production of polyamides used, for example, for synthetic fibres, but the known methods of purification have serious disadvantages. Attempts have therefore been made to improve the purification methods by conducting the lactam solutions through ion exchangers, treating them with adsorbents such as active charcoal or calcium silicate or subjecting them to hydrogenation or even to an oxidation reaction. Crystallisation carried out in water or in aliphatic or aromatic hydrocarbons has also been proposed as a method of purification.

There has hitherto been no simple and economical method available for purifying heavily contaminated caprolactam which may also contain substantial quantities of cyclohexanone oxime. Caprolactam which contains oxime is obtained mainly in the catalytic gas phase rearrangement of cyclohexanone oxime because, as the activity of the catalyst diminishes, any unreacted oxime leaves the reactor and is deposited in the condenser together with the caprolactam produced. Separation of oxime from lactam by physical methods either cannot be carried out or can only be carried out with considerable technical effort, especially if the oxime content is below 1 percent, because the two substances are very similar in their physical properties. Removal of the oxime is, however, absolutely essential in order to prevent trouble in the subsequent processing of the lactam.

It was an object of this invention to develop a simple and economic method of purification by which the many impurities could be removed without a substantial decrease in the yield of purified caprolactam.

This invention thus relates to a process for the purification of $\epsilon$-caprolactam which is characterised in that solid, finely divided crude lactam is acted upon by an organic solvent at 0° to 50°C for up to 60 hours.

Suitable solvents are those organic compounds in which the solubility of caprolactam at 25°C is greater than 15 g of lactam per 100 g of solvent.

Preferred solvents are alcohols which contain 1 to 5 carbon atoms such as methanol, ethanol, n-propanol, isopropanol, n-butanol, isobutanol and amyl alcohol, esters of carboxylic acids with 1 or 2 carbon atoms in the acid component and 1 to carbon atoms in the monohydric alcohol component, e.g. methyl, ethyl, propyl, isopropyl, n-butyl and isobutyl formate, as well as methyl, ethyl, propyl, butyl and isobutyl acetate, ketones with less than 9 carbon atoms, e.g. acetone, methyl ethyl ketone, diethyl ketone, diisopropyl ketone, diisobutyl ketone, dibutylketone, methylisobutyl ketone and ethyl isobutyl ketone, benzene and alkyl aromatic compounds with 7 to 12 carbon atoms such as toluene, xylene, ethyl benzene, cumene, diisopropyl benzene, cyclic ethers such as dioxane, 1,3-dioxane, 1,4-dioxane and tetrahydrofuran, carboxylic acid amides with 1 or 2 carbon atoms in which the amide nitrogen may be substituted with alkyl groups containing 1 or 2 carbon atoms, e.g. formamide, dimethylformamide or dimethylacetamide, and aliphatic chlorinated hydrocarbons containing 1 to 6 carbon atoms, e.g. methylene chloride, carbon tetrachloride, chloroform, ethylene dichloride, propylene-1,3-dichloride, butylene-1,4-dichloride, 1,1,1-trichloroethane, trichloroethylene and cyclohexyl chloride.

Dimethylformamide, ethylformate, ethyl acetate, dioxane, methanol, acetone, isopropanol, isobutanol, carbon tetrachloride, methylene chloride, methyl isobutyl ketone, toluene, ethylbenzene, xylene, cumene and benzene are particularly preferred.

The crude $\epsilon$-caprolactam which is to be purified may be prepared either by a Beckmann rearrangement in the presence of an acid or by rearrangement of cyclohexanone oxime in the gaseous phase in the presence of solid catalysts or by depolymerisation of polyamide waste. In industrial processes for carrying out the Beckmann rearrangement, a large excess of acid is used to ensure that rearrangement will not be complete. This acid excess is no longer necessary when using the purification process according to the invention.

The purification process is particularly suitable for the purification of $\epsilon$-caprolactam but may also be used for the purification of other lactams, e.g. the lactams of $\omega$-aminovaleric acid, $\omega$-aminocaprylic acid, $\omega$-aminoundecanoic acid or $\omega$-aminolauric acid.

A particular feature of the process according to the invention is that while using a relatively small quantity of extraction liquid and without renewing it, the purification effect is all the greater the longer the extraction liquid is left to act on the crude lactam.

The purification process according to the invention may be carried out by preparing a saturated solution of the crude lactam in one of the above mentioned solvents at a particular temperature between 0° and 50°C, e.g. at room temperature. The crude lactam which is to be purified is then introduced into such a solution with stirring, preferably in a finely divided form such as may be obtained e.g. by scraping on a cooling roller. The proportion by weight of solid crude lactam to the quantity of saturated lactam solution used may be between 1:10 and 10:3. It is preferably in the region of 1:1 to 1:2 so that the suspension may be easily stirred.

The suspension is stirred for up to 60 hours or left to stand. The minimum time required depends on the degree of contamination of the crude lactam, and the more heavily contaminated it is the longer should be the stirring time. The minimum time required in each individual case for the interaction between the solution and crude lactam can rapidly be determined by a suitable laboratory test.

After filtration of the suspension, the separated caprolactam is washed with a solvent or, in order to obtain a higher yield, it may be washed with a lactam solution.

The solvent used for washing lactam which has been purified by diffusion is preferably the same as that used for extraction or a solvent which already contains lactam in solution, but other solvents may also be used if desired.

In view of the high solubility of lactam, it is advantageous for the purpose of obtaining high yields in the purification process according to the invention to wash the lactam by a countercurrent method so that the washing liquids are used several times until, when they are too highly contaminated, they are distilled to remove the lactam and recover the solvent. The separated lactam is then returned to the extraction stage of the purification process.

Even lactam solutions which are left to act for a long time on crude lactam may be used several times before they are worked up by distillation, and the separated lactam and solvent may again be returned to the extraction stage while the fraction which contains cyclohexanone oxime may be returned to the oxime rearrangement stage.

The degree of purification of the extracted lactam depends on the nature of the impurities in the crude lactam, and these may vary considerably according to the method by which the lactam was prepared, whether by the Beckmann rearrangement, by the catalytic rearrangement of cyclohexanone oxime or by the depolymerisation of polyamide waste.

If the crude lactam has been obtained by the Beckmann rearrangement carried out in an industrial production plant, pure lactam which has the desired purity after removal of the solvent adhering to it can be obtained after a realtively short extraction time of about 3 hours. Removal of the solvent residues may be carried out by treatment with nitrogen or steam or by partial distillation.

In crude lactam obtained from catalytic oxime rearrangement, the degree of impurity is much higher. In addition to cyclohexanone oxime, cyclohexanone, cyclohexanol and hexenic acid nitrile, this crude lactam contains a large number of unidentifiable impurities in very small quantities. The solid-liquid extraction according to the invention removes these contaminations which would otherwise prevent the lactam from being obtainable with the required high degree of purity even with, for example, very laborious rectification. Nevertheless, distillation, rectification or crystallisation must be carried out in addition, according to the degree of purification and the selected extraction conditions, among which the most important are the solvent used and the extraction time. The conditions under which the extraction should be carried out cannot be specified exactly since the degree of contamination of the crude lactam depends on the catalyst activity, e.g. of the boronoxide-containing catalyst.

Exceptionally pure lactam can be obtained from heavily contaminated crude lactam produced by catalytic oxime rearrangement in the gaseous phase if the crude lactam in the form of a finely divided solid is first extracted with one of the above mentioned solvents in accordance with the invention or with a suitable lactam solution and then recrystallised. The time required for extraction is in this case less than 1 hour. For a combination of extraction and recrystallisation, it is found very advantageous to use benzene, toluene, xylene or ethyl benzene. To remove the solvent which still adheres to the lactam after crystallisation, the lactam is boiled under reflux at reduced pressure and then distilled under vacuum. No rectification is required in this case if the lactam is recrystallised after extraction. The temperature at which the crystallisation is carried out after the solid-liquid extraction depends on the nature of the crystallisation apparatus used and is preferably in the region of from 10° to 40°C. The ratio by weight of lactam crystals to mother liquor may be between 5:1 and 1:10. The purification process is not limited to the use of any particular crystallisation apparatus so that the usual industrial cooling crystallisers, vacuum crystallisers or evaporation crystallisers may be used.

The process of purification by extraction and crystallisation may be rendered continuous by linking together the individual operations mentioned above as will be described below (the reference numerals and letters refer to FIG. 1).

Crude lactam and lactam returned from stages (C) and (E) are fed into the extraction apparatus (A) through the conduits (1), (6) and (9). The extraction solution obtained from the following recrystallisation stage enters through conduit (6). Extracted lactam enters the crystallisation apparatus (B) through (2). Recrystallised lactam is separated from the mother liquor in the separating apparatus (C) (e.g. a plate filter, rotary filter or centrifuge) and washed with a solvent from conduit (10). Part of the mother liquor is branched off for extraction (conduit 6) and the remainder together with washing liquor enters the crystallisation apparatus (B) through conduit (7). The washed lactam crystals are fractionally distilled in (D). First runnings and distillation residue are returned to crystallisation stage (B) by way of (11). Part of the extraction solution obtained in the extraction stage (A) is worked up in the distillation stage (E) while most of the extracting agent is used for extracting more lactam. Solvent is then removed from distillation apparatus (E) (conduit 10). The next fraction to distil over is cyclohexanone oxime which is returned to the catalytic rearrangement stage (13). The third fraction, which consists mainly of lactam alone, is returned to the extraction apparatus (A) by way of conduit (9). The residue, in which the high boiling impurities accumulate, is discharged through conduit (14) and sprayed on the hot catalyst which is in the fluidised bed of the catalytic oxime rearrangement stage.

Crude lactam which has been obtained by the depolymerisation of polyamide waste may also vary considerably in its degree of contamination, depending on the composition of the polyamide waste used as starting material. For the purification of lactam which has been obtained by depolymerisation, it is therefore also advisable to determine by laboratory tests the most suitable conditions for extraction. This depolymerisation lactam is advantageously distilled after extraction or, if desired, recrystallised once more. For purifying this type of lactam, substantially the same conditions apply as for the purification of the crude lactam obtained from the catalytic oxime rearrangement.

Extraction may be carried out using conventional commercial extraction apparatus such as fixed or rotary individual extractors which operate discontinuously. If desired, the extraction may also be carried out semicontinuously in several extractors arranged in series, the extraction solvent and the lactam which is to be extracted being carried in countercurrent to each other. Lactam extraction may also be carried out using continuously operating extraction apparatus in which the extracting agent and the material which is to be extracted are moved in countercurrent to each other by means of conveyor elements. Extraction may also be carried out using filter presses in which the suspended crude lactam is first pressed off and the filter cake then washed with the extraction solution.

The degree of purification obtained by solid-liquid extraction can be even further increased by adding up to 10 percent of one of the solvents mentioned above to the crude lactam melt before it is solidified on a cooling roller or equivalent commercial apparatus.

Additional purification is achieved by melting the extracted lactam again, leaving it to solidify and again extracting it. This repeated method is particularly important for heavily contaminated crude lactam.

The degree of purification of the resulting caprolactam was determined by measuring the usual characteristics. The Hazen colour number is defined according to ASTM D 1209. The permanganate number is defined as the time in seconds after which the colour of a solution of 1 g of ε-caprolactam in 100 ml of water has faded after the addition of 1 ml of N/100 $KMnO_4$ solution of the colour of a standard solution which contains 2.5 g of $Co(NO_3)_2 \cdot 6 H_2O$ and 0.01 g of $K_2Cr_2O_7$ in 1 l of water. The volatile bases are expressed in terms of ml of N/10 sulphuric acid for 20 g of caprolactam.

The following Examples serve to explain the purification process according to the invention without limiting it.

EXAMPLE 1

A pale brown crude ε-caprolactam obtained from the catalytic rearrangement of cyclohexanone oxime was used. It has the following composition:
96.8% of caprolactam
3.0% of cyclohexanone oxime
0.2% of various by-products The characteristics of the lactam were determined on the main fraction and are summarized in the following table with reference to the various solvents used. For comparison, the figures in the first line of the Table represent the characteristics of crude lactam which has only been treated with steam for 1 hour and then distilled under vacuum after the addition of sodium hydroxide in the same way as the other samples.

The figures at the end of the Table represent the result of two experiments which were carried out in a different manner from the other experiments in that the extraction of the crude lactam was carried out for 24 hours at 0°C (No.18) and at 40°C (No.19). Extraction was carried out using a lactam-methanol solution saturated at 0°C and 40°C, respectively.

The Table shows how much the different solvents differ in their effects. It is found in practice that any solvents which give rise to $KMnO_4$ numbers of more than 3000 under the conditions employed here are suitable. These are solvents which according to the Table dissolve more than 15 g of lactam per 100 g of solvent at 25°C. The degree of purity of the lactam is then so high that the lactam will have the required degree of purity after fractional distillation under vacuum.

Table

Extraction experiments at 25°C, 0°C* and 40°C**

| Solvent | Solubility (25°C) g of lactam in 100 g of solvent | Hazen colour number | Solidification point °C | Volatile bases | $KMnO_4$ number |
|---|---|---|---|---|---|
| Comparison substance |  | 70–80 | 67.4 | 2.00 | 0 |
| 1. Isooctane | 1 | 20 | 68.6 | 0.88 | 0 |
| 2. Diisobutylene | 2 | 60 | 68.78 | 1.04 | 60 |
| 3. Cyclohexane | 2 | 5–10 | 69.02 | 0.28 | 1100 |
| 4. Perchloroethylene | 11 | 5 | 69.09 | 0.13 | 1500 |
| 5. Cumene | 27 | 5 | 69.05 | 0.2 | 4200 |
| 6. Methylisobutylketone | 39 | 5 | 69.03 | 0.14 | 8000 |
| 7. Carbon tetrachloride | 43 | 5 | 69.00 | 0.16 | 7800 |
| 8. Ethyl acetate | 43 | 5 | 69.04 | 0.08 | ~8000 |
| 9. Toluene | 48 | 5 | 69.04 | 0.11 | 5000 |
| 10. Methyl acetate | 60 | 10 | 69.08 | 0.10 | 21000 |
| 11. Dioxane | 68 | 5 | 69.05 | 0.08 | 3600 |
| 12. Ethyl formate | 89 | 5 | 69.06 | 0.16 | 19000 |
| 13. Acetone | 96 | 5 | 69.04 | 0.13 | 12000 |
| 14. Dimethylformamide | 100 | 5 | 69.11 | 0.14 | 19000 |
| 15. Isobutanol | 150 | 5 | 69.01 | 0.10 | 7500 |
| 16. Isopropanol | 178 | 5 | 69.03 | 0.16 | 9100 |
| 17. Methanol | 380 | 5 | 69.04 | 0.16 | 20000 |
| 18. Methanol* | 380 | 5 | 69.00 | 0.13 | 20400 |
| 19. Methanol** | 380 | 10 | 69.07 | 0.13 | 27000 | and the following characteristics:

| Solidification point | 64°C |
|---|---|
| Hazen colour number above | 300 |
| Volatile bases | 6.68 |
| $KMnO_4$ number | 0. |

In each case, 400 g of the crude lactam were added to 600 g of a saturated solution of lactam in one of various solvents and the mixture was stirred for 24 hours at 25°C. The lactam was then filtered off and carefully washed with a solution which was saturated with lactam. To remove the solvent adhering to the lactam, the lactam was first treated with steam for one hour and then distilled under vacuum with the addition of 0.3 percent of NaOH. From each distillation carried out with various solvents, 10 percent of first runnings and 10 percent of residue were removed.

EXAMPLE 2

Four hundred g portions of crude ε-caprolactam which had been prepared by catalytic rearrangement of cyclohexanone oxime and still contained 0.1 percent of oxime were mixed in each case with 400 g of a solution of lactam in methanol saturated at 25°C and stirred for various lengths of time, i.e. 1, 2, 4, 6 and 24 hours at 25°C. The resulting paste was filtered. The lactam thereby separated was carefully washed with a saturated solution of lactam in methanol and then distilled under vacuum after the addition of 0.3 percent of sodium hydroxide, 10 percent of the first runnings and 10 percent of residue being removed in each case. The following characteristics were then determined on the purified lactam:

| Stirring time | 1 | 2 | 4 | 6 | 24 | hours |
|---|---|---|---|---|---|---|
| Hazen colour number | 5 | 5 | 5 | 5 | 5 | |
| Solidification point | 69.1 | 69.1 | 69.1 | 69 | 69.1 | °C |
| Volatile bases | 0.15 | 0.14 | 0.12 | 0.12 | 0.09 | |
| KMnO₄ number | 2500 | 3600 | 0800 | 8000 | 36000 | |

EXAMPLE 3

Four hundred g of crude ε-caprolactam obtained from Beckmann rearrangement in an industrial production plant and scraped off a cooling roller were mixed in each case with 600 g of a saturated solution of crude lactam in acetone, ethanol, dioxane or methyl acetate and digested for 3 hours at 25°C. The resulting suspension was then filtered and the lactam washed twice, each time with 100 g of a saturated solution of lactam in the given solvent. The lactam obtained in this way was refluxed at 0.1 mm Hg for 20 minutes to remove the solvent adhering to it. The purified lactam obtained using the different solvents mentioned above had the following characteristics:

| Solvent | Solidification point | Hazen colour number | Volatile bases | KMnO₄ number |
|---|---|---|---|---|
| Acetone | 69.08 | 5 | 0.12 | >40000 |
| Ethanol | 69.14 | 10 | 0.04 | >40000 |
| Dioxane | 69.02 | 5 – 10 | 0.05 | 33000 |
| Methyl acetate | 69.00 | 5 | 0.05 | >40000 |
| Original crude lactam | <60 | >100 | 0.40 | 60 |

Example 4

A lactam obtained by depolymerisation in a recovery plant and scraped off a cooling roller had the following characteristics:

| | |
|---|---|
| Hazen colour number | above 100 |
| Solidification point | 68°C |
| Volatile bases | 1.62 |
| KMnO₄ number | 0. |

2.8 kg of the depolymerisation lactam were added to 2 kg of a solution of depolymerisation lactam in toluene which was saturated at 25°C, and left there for 24 hours at 25°C with stirring. The resulting crystal paste was filtered and the filtered lactam was carefully washed with a saturated solution of lactam in toluene. The resulting 2.3 kg of caprolactam were fractionally distilled after the addition of 0.3 percent of sodium hydroxide. After removal of 8 percent of first runnings and 15 percent of residue, the main fraction had the following characteristics:

| | |
|---|---|
| Hazen colour number | 5 |
| Solidification point | 69.01°C |
| Volatile bases | 0.05 |
| KMnO₄ number | >40000 |

EXAMPLE 5

A caprolactam which had been produced by gas phase rearrangement in the presence of a borontrioxide catalyst and then scraped off a cooling roller was used. It was pale brown and contained 3 percent of cyclohexanone oxime and 0.6 percent of various foreign substances. A solution of this crude lactam in benzene which was saturated at 1° to 3°C was prepared. Three kg of crude lactam were added to 3 kg of this solution. The mixture was stirred for 4 hours and maintained at a temperature of 1° to 3°C during this time. It was then filtered and the lactam was washed with 3 kg of a saturated solution of pure lactam in benzene. The yield of moist lactam was 90 percent. After the addition of 0.3 percent of sodium hydroxide, the lactam was fractionally distilled under vacuum. 23 percent of first runnings and 27 percent of residue were removed. The lactam which remained had the following characteristics:

| | |
|---|---|
| Solidification point | 69.04 |
| Hazen colour number | 5 |
| Volatile bases | 0.08 |
| Permanganate number: | >40000 |

EXAMPLE 6

The crude ε-caprolactam used in this example and in Examples 7 to 9 was one which had been obtained b rearrangement of cyclohexanone oxide in the gaseous phase in the presence of a boron trioxide catalyst and scraped off a cooling roller. This crude lactam contained 3.6 percent of cyclohexanone oxime and a total of about 1 percent of by-products.

Purification of the crude lactam was carried out at room temperature (21° to 27°C) by the countercurrent method illustrated in FIG. 1. Extraction was carried out using a glass tube with a diameter of 5 cm and length 150 cm with a glass frit fused into the lower end of the tube. 600 g of crude lactam were introduced into this glass tube. 0.8 kg of a saturated solution of lactam in benzene was poured on this lactam in four portions. The first half of the extraction solution which dripped from the column was branched off and the second half was used for extracting more crude lactam in the next cycle. After extraction, the lactam was introduced into a stirrer vessel containing 1 kg of a benzene-lactam solution which was saturated at room temperature. The mixture was heated to 60°C to dissolve the lactam completely. The resulting solution was cooled to room temperature with stirring to recrystallise the lactam. The lactam crystals were suction filtered, washed with 0.4 kg of a saturated solution of lactam in benzene and finally washed with 200 g of benzene. In the next cycle, the liquor from the first washing was added to the mother liquor from which the appropriate quantity had first been branched off for extraction. The quantity of mother liquor (1 kg) was thereby kept constant throughout the following recrystallisations. The washing liquor obtained from washing the recrystallised lactam with pure benzene was used for the first stage of washing the recrystallised lactam in the second cycle, etc.. Six hundred g of crude lactam were in this way purified four times, 405 g of pure lactam being obtained in the first cycle, 490 g in the second, 355 g in the third and 405 g in the fourth cycle.

The lactam was distilled at 0.1 mm Hg after the addition of 0.3 percent of sodium hydroxide, 7 percent being removed as first runnings and 3.7 percent as residue. The characteristics of the purified lactam obtained were very satisfactory after each passage; for example, the characteristics after the fourth cycle were as follows:

| | |
|---|---|
| Solidification point | 69 |
| Hazen colour number | 5 |
| Volatile bases | 0.11 |
| UV number | 99 |
| Permanganate number | >40000 |

EXAMPLE 7

Crude ε-caprolactam was purified by extraction and recrystallisation in the same way as in Example 6 but using a saturated solution of lactam in o-xylene. Extraction was carried out in the same tube and at room temperature (20 to 26°C). 1 kg of crude lactam was put into each cyle. An average of 1.1 kg of saturated solution in o-xylene was available for extraction. The quantity of mother liquor in which the extraction lactam was recrystallised was 1 kg as in Example 6. The lactam crystals were re-washed at each cycle but in this case finally re-washed with 300 g of oxylene.

Recrystallisation was carried out in the same way as in Example 6, i.e. the lactam was dissolved by heating to 60°C and the resulting solution was cooled to room temperature.

The amount of pure lactam obtained from 1 kg of crude lactam in each cycle was 0.73 kg in the first cycle, 0.66 kg in the second cycle, 0.80 kg in the third cycle and 0.68 kg in the fourth cycle.

The lactam obtained in this way was distilled with the addition of 0.3 percent of NaOH, first runnings of about 5 percent being obtained for removing the solvent. The amount of distillation residue was 8.4 percent. The resulting distilled caprolactam had the following characteristics after the fourth cycle:

| | |
|---|---|
| Solidification point | 69.1 |
| Hazen colour number | 5 |
| Volatile bases | 0.09 |
| UV number | 98 |
| Permanganate number | >40000 |

EXAMPLE 8

One kg of crude ε-caprolactam was suspended in 1 kg of a solution of 21.4 percent by weight of lactam and 78.6 percent by weight of toluene with stirring. The resulting suspension was filtered and the filter cake extracted twice, each time with 0.3 kg of the aforesaid solution of lactam in toluene. This partly purified caprolactam was recrystallised from 400 g of toluene by cooling the lactam solution to 25°C. The lactam crystals separated from the mother liquor were suction filtered three times, each time with 100 ml of toluene. Three hundred and nineteen g of caprolactam were obtained in this way. The lactam was distilled at 0.1 mm Hg after the addition of 0.3 percent of NaOH, 6 percent being removed as first runnings and 11 percent as distillation residue. The characteristics of this purified lactam were as follows:

| | |
|---|---|
| Solidification point | 69.1 |
| Hazen colour number | 5 |
| Volatile bases | 0.11 |
| UV number | 99 |
| Permanganate number | >40000 |

EXAMPLE 9

Crude ε-caprolactam was purified by extraction and recrystallisation in the same way as in Example 6 but using a lactam solution in ethyl benzene which was saturated at room temperature. The same glass tube was used for extraction as in Example 6. Again 600 g of crude lactam obtained by catalytic rearrangement in the gaseous phase were used in each cycle but the quantity of mother liquor from which the extracted lactam was recrystallised at room temperature was 0.8 kg. At each cycle, the recrystallised lactam was finally re-washed with 200 g of ethylbenzene.

Six hundred g of crude lactam were purified four times in this way, the amount of pure lactam obtained being 393 g in the first cycle, 417 g in the second, 411 g in the third and 411 g in the fourth cycle. The lactam from the fourth cycle was distilled with the addition of 0.3 percent of NaOH, 4 percent being removed as first runnings and 10 percent as residue. The lactam obtained had the following characteristics:

| | |
|---|---|
| Solidification point | 69.07 |
| Hazen colour number | 5 |
| Volatile bases | 0.11 |
| UV number | 98 |
| Permanganate number | >40000. |

EXAMPLE 10

The crude ε-caprolactam used had been obtained from Beckmann rearrangement in an industrial production plant and had the purity characteristics indicated in Example 3. Two experiments were carried out for comparison with this crude lactam, 5 percent of 1,4-dioxane being added in only one case to the crude lactam melt before it was scraped off the cooling roller. Both lactams, the one with and the one without the addition of dioxane, were purified under identical conditions as described below.

Four hundred g of crude lactam were digested in 400 g of a saturated solution of crude lactam and toluene for 2 hours at 25°C. The resulting suspension was filtered and the lactam carefully washed with a saturated solution of lactam in toluene. The lactam obtained in this way was refluxed at 0.1 mm Hg for 20 minutes to remove adhering solvent. The purified lactam obtained from the aforesaid flakes of crude lactam scraped off cooling rollers had the following characteristics:

| 1,4-dioxane in crude lactam | 0 | 5% |
|---|---|---|
| Hazen colour number | 5 | 5 |
| Solidification point | 69.1 | 69.1 |
| Volatile bases | 0.09 | 0.05 |
| UV number | 89 | 93 |
| KMnO₄ number | >40000 | >40000 |

EXAMPLE 11

Five percent of toluene were added to the crude ε-caprolactam before it was scraped off a cooling roller in order to enhance the purification effect obtained by solid-liquid extraction with a toluene solution. For the same reason, the extracted lactam was remelted, again scraped off the cooling roller and extracted a second time. The crude lactam scrapings used as starting material were pale brown and contained 0.3 percent of by-products, 3 percent of oxime and the added 5 percent of toluene. 1 kg of this crude lactam was added to 1 kg of a saturated solution of caprolactam in toluene and stirred at room temperature for 2 hours. The resulting lactam paste was filtered and washed twice, each time with 300 g of a saturated solution of lactam in toluene. The lactam, which contained about 14 percent of toluene as residual moisture, was melted by heating to about 80°C and again scraped off a cooling roller. These lactam scrapings were added to 1 kg of a saturated solution of lactam in toluene and again digested for 2 hours. The solid lactam was then filtered off and washed twice, each time with 300 g of toluene. The liquor obtained from digestion and the washing liquor were collected separately and used in the same sequence for the next cycle to purify a further 1 kg of crude lactam.

In the second cycle, the first washing liquor was added to the first mashing liquor from which the appropriate quantity had first been removed so that the total quantity of digestion liquor was again 1 kg. The second washing liquor from the first cycle was then used for carrying out the first washing of the second cycle. Part of the second digestion liquor from the first cycle was used for the second washing, the digestion liquor being again made up to 1 kg after addition of the third washing liquor.

Before the second digestion, the lactam was again melted and scraped off as in the first cycle. After the second digestion, the filtered lactam was washed with washing liquor which had already been used in the previous cycle and it was then rewashed with 300 g of toluene. Seven hundred and twenty-two g of lactam were obtained in the second cycle in this way. 0.3 percent of sodium hydroxide was added to the moist lactam which was then distilled at 0.2 mm Hg, 5 percent of first runnings and 7.5 percent of residue being removed. The main fraction of lactam had the following characteristics:

| | |
|---|---|
| Solidification point | 69.1°C |
| Hazen colour number | 5 |
| Volatile bases | 0.10 |
| UV number | 100 |
| $KMnO_4$ number | >40000. |

What we claim is:

1. A process for the purification of impure solid $\epsilon$-caprolactam which comprises extracting said lactam with a saturated solution of said lactam in a solvent for a period of up to 60 hours at a temperature of 0° to 50°C., said solvent being one in which said lactam has a solubility at 25°C. which is greater than 15 g of said lactam per 100 g of solvent.

2. A process as claimed in claim 1 wherein the extracted $\epsilon$-caprolactam is melted, allowed to solidy and extracted again.

3. A process as claimed in claim 1 in which the solvent is an alcohol which contains from 1 to 5 carbon atoms, an ester of a carboxylic acid with 1 or 2 carbon atoms in the acid component and 1 to 4 carbon atoms in the monohydric alcohol component, a ketone with less than 9 carbon atoms, benzene, an alkyl aromatic compound with 7 to 12 carbon atoms, a cyclic ether, a carboxylic acid amide in which the amide nitrogen may be substituted with an alkyl group containing 1 or 2 carbon atoms or an aliphatic chlorinated hydrocarbon containing 1 to 6 carbon atoms.

4. A process as claimed in claim 3 in which the solvent is dimethylformamide, ethyl formate, ethyl acetate, dioxane, methanol, acetone, isopropanol, isobutanol, carbon tetrachloride, methylene chloride, methyl isobutyl ketone, toluene, ethylbenzene, xylene, cumene or benzene.

5. A process as claimed in claim 1 in which the crude $\epsilon$-caprolactam is prepared by a Beckmann rearrangement.

6. A process as claimed in claim 1 in which the crude $\epsilon\epsilon$-caprolactam is obtained by a gaseous phase rearrangement of cyclohexanone oxime in the presence of a solid catalyst.

7. A process as claimed in claim 1 in which the crude lactam is obtained by the depolymerisation of polyamide waste.

8. A process as claimed in claim 1 in which the crude lactam which is to be purified is introduced into a saturated solution of crude lactam in the organic solvent, the suspension is stirred and then left to stand.

9. A process as claimed in claim 8 in which the proportion by weight of solid crude lactam to the quantity of saturated lactam solution is between 1:10 and 10:3.

10. A process as claimed in claim 8 in which the proportion by weight of solid crude lactam to the quantity of saturated lactam solution used is between 1:1 and 1:2.

11. A process as claimed in claim 1 in which the lactam suspension is filtered and the separated caprolactam is washed with a lactam solution or a solvent.

12. A process as claimed in claim 11 in which the lactam is washed by a countercurrent method.

13. A process as claimed in claim 1 in which the extracted $\epsilon$-caprolactam is, in addition, fractionated, distilled and/or recrystallized.

14. A process for the purification of $\epsilon$-caprolactam in which an organic solvent is added to the crude lactam melt before it is solidified and treated as claimed in claim 1.

15. A process as claimed in claim 14 in which the organic solvent is added up to 10 percent.

* * * * *